United States Patent Office 3,429,951
Patented Feb. 25, 1969

3,429,951
REACTION OF PEROXIDES WITH BLENDS OF POLYSTYRENE AND RUBBERY BLOCK COPOLYMER
Clifford W. Childers, Bartlesville, Okla., assignor to Phillips Petroleum Company, a corporation of Delaware
No Drawing. Filed Sept. 7, 1965, Ser. No. 485,625
U.S. Cl. 260—876  12 Claims
Int. Cl. C08f 33/08

ABSTRACT OF THE DISCLOSURE

A method of making polystyrene compositions comprising blending polystyrene, at least one solution polymerized block copolymer, and a peroxy oxygen containing material, and subjecting the blend to temperatures sufficient to decompose the peroxy oxygen containing material.

---

This invention relates to a method for making polystyrene compositions with improved properties and the composition thereof. In one aspect this invention relates to a method of peroxide treatment for substantially increasing the elongation of a polystyrene composition with no sacrifice and sometimes an increase in both tensile and impact strengths of those compositions. In another aspect, this invention relates to the method as set forth above wherein, in addition, the compositions remain processable after the peroxide treatment.

Heretofore, emulsion-polymerized butadiene-styrene copolymers, which inherently have a high non-rubbery residue content in comparison with solution polymers, have been added to polystyrene to overcome the brittleness of that material. In so doing, the impact strength of the polystyrene is increased a slight amount, and oftentimes, at the same time, the tensile strength and/or elongation of the polystyrene is substantially decreased. Thus, heretofore, experience with such mixtures of materials has indicated that one or more properties cannot be improved without sacrificing one or more other, sometimes equally as important, properties.

Quite surprisingly, it has been found that a spectacular increase in elongation of a polystyrene-conjugated diene block copolymer composition can be achieved without sacrifice of tensile or impact strengths, and sometimes with an increase of one or both of these properties, by incorporating in the composition a peroxy compound which will provide from about 0.25 to about 6, preferably from about 0.35 to about 4.5, gram millimoles of peroxy oxygen per 100 grams of conjugated diene in the copolymer.

Accordingly, it is an object of this invention to provide a new and improved method for producing improved polystyrene compositions. It is another object of this invention to produce a new and improved polystyrene composition which also remains processable after treatment.

Other aspects, objects and the several advantages of this invention will be apparent to those skilled in the art from the description and the appended claims.

According to this invention there is provided a method of making polystyrene compositions which contain at least 50 weight percent polystyrene, the remainder being substantially all a solution-polymerized block copolymer of a conjugated diene and a monovinyl substituted aromatic compound and to which has been added a compound containing peroxy oxygen in the amounts set forth above. This blend of materials is heated either during blending or after blending or both, at a temperature at or above that which causes decomposition of the peroxyoxygen-containing compound. By this method very spectacular increases in elongation of the blend are effected with no sacrifice, and oftentimes substantial increases, of other important physical properties.

Generally, any commercially available, general purpose polystyrene can be employed in the practice of this invention. The copolymers which can be blended with polystyrene can be any copolymer formed by a solution-polymerization technique and having a block structure. The block structure is characterized in that the molecules of the final polymer product are composed of contiguous blocks, or segments, of different polymeric types, for example, one of the blocks forming the polymer chain can be a homopolymer of a conjugated diene or a copolymer of a conjugated diene and a monovinyl substituted aromatic compound while an adjacent block in that same chain can be a homopolymer of a monovinyl aromatic compound or a copolymer of a monovinyl aromatic compound and a conjugated diene. It should be noted that one or more conjugated diene copolymer blocks can be present in the block copolymer used in the compositions of this invention. Also, mixtures of different block copolymers can be used.

The conjugated diene block should be rubbery, i.e. contain from 50 to 100 parts by weight of conjugated diene based on 100 parts by weight of the conjugated diene block. The monovinyl aromatic block is resinous and preferably a homopolymer of a monovinyl aromatic compound such as styrene but can be a copolymer which contains at least 80 parts by weight of monovinyl aromatic compound based on 100 parts by weight of the monovinyl aromatic block. The block copolymer should contain from 5 to 75 parts by weight of the monovinyl aromatic block based on 100 parts by weight of the block copolymer.

The amount of conjugated diene employed in preparing the rubbery block copolymers of this invention can vary from about 40 to about 95 parts by weight per 100 parts by weight of monomers employed to make the block copolymer, the remainder being the monovinyl substituted aromatic compound. Preferably the block copolymers contain at least 50 parts by weight of conjugated diene per 100 parts by weight of monomers employed to make the block copolymer, and at least 5 parts by weight of a monovinyl aromatic compound in the homopolymerized form per 100 parts by weight of monomers employed to make the block copolymer as determined by oxidative degradation, the remainder being substantially all a monovinyl aromatic compound.

The oxidative degradation test is based upon the principle that polymer molecules containing ethylenic bonds when dissolved in p-dichlorobenzene and toluene can be broke into fragments by reaction with tert-butyl hydroperoxide catalyzed with osmimum tetroxide. Saturated polymer molecules or molecular fragments such as polystyrene or the polystyrene units in block copolymers containing no ethylenic bonds remain unattacked. The small fragments (low molecular weight aldehydes) and the low molecular weight polystyrene fragments from the copolymer block are soluble in ethanol whereas the unattacked high molecular weight polystyrene from the styrene homopolymer blocks is insoluble in ethanol. It is thus possible to effect a separation of the high molecular weight polystyrene which constitutes the homopolymer blocks of the block copolymer.

The conjugated dienes that can be employed in preparing the copolymers applicable to this invention are those containing from 4 to 10 carbon atoms per molecule, for example, 1,3-butadiene, isoprene, 1,3-pentadiene (piperylene), 1,3-hexadiene, 2,3-dimethyl-1,3-butadiene, 1,3-octadiene, 4-ethyl-1,3-hexadiene, 4-phenyl-1,3-butadiene, and the like. Preferred conjugated dienes are butadiene, isoprene, and piperylene.

Monovinyl substituted aromatic compounds that can be employed in the copolymers of this invention are those containing from 8 to 12 carbon atoms per molecule, for example styrene, 3-methylstyrene, 4-methylstyrene, 4-isopropylstyrene 2,4 - dimethylstyrene, 1 - vinylnaphthalene, 2-vinylnaphthalene, and the like.

Solution-polymerized copolymers having block distribution of the monomers in the copolymer chain can be formed by polymerizing a first monomer in the presence of an organolithium catalyst to form a homopolymer, and subsequently adding a second monomer to the polymerization zone and continuing the polymerization operation. Block copolymers can also be formed by contacting a mixture of the selected conjugated diene and monovinyl substituted aromatic with an organolithium catalyst in the presence of a hydrocarbon diluent selected from the group consisting of aromatic, paraffinic and cycloparaffinic hydrocarbons. The polymerization is generally carried out at a temperature within the range of from about $-20$ to about 150, preferably from about $-10$ to about 80° C., and at pressures sufficient to maintain the materials present substantially in the liquid phase. The pressure will depend upon, inter alia, the particular materials being polymerized, the diluent being employed, and the temperature at which the polymerization is carried out. Pressures higher than autogenous can be employed if desired by the use of any suitable method such as the pressurization of the reactor with an inert gas.

The organolithium compounds used correspond to the formula $R(Li)_x$, wherein R is a hydrocarbon radical selected from the group consisting of aliphatic cycloaliphatic and aromatic radicals and $x$ is an integer from 1 to 4, inclusive. The aliphatic and cycloaliphatic radicals can be saturated or contain olefinic unsaturation. The R in the formula has a valence equal to the integer, and preferably contains from 1 to 20 inclusive, carbon atoms, although it is within the scope of the invention to use higher molecular weight compounds. Examples of these compounds include methyllithium,
isopropyllithium,
n-butyllithium,
tert-octyllithium,
n-decyllithium,
phenyllithium,
naphthyllithium,
4-butylphenyllithium,
p-tolyllithium,
4-phenylbutyllithium,
cyclohexyllithium,
4-butylcyclohexyllithium,
4-cyclohexylbutyllithium,
dilithiomethane,
1,4-dilithiobutane,
1,10-dilithiodecane,
1,20-dilithioeicosane,
1,4-dilithiocyclohexane,
1,4-dilithio-2-butene,
1,8-dilithio-3-decene,
1,4-dilithiobenzene,
1,4-dilithionaphthalene,
1,2-dilithio-1,3-diphenylethane,
9,10-dilithio-9,10-dihydroanthracene,
1,2-dilithio-1,8-diphenyloctane,
1,3,5-trilithiopentane,
1,5,15-trilithioeicosane,
1,3,5-trilithiocyclohexane,
1,2,5-trilithionaphthalene,
1,3,5-trilithioanthracene,
1,3,5,8-tetralithiodecane,
1,5,10,20-tetralithioeicosane,
1,2,4,6-tetralithiocyclohexane,
1,2,3,5-tetralithio-4-hexylanthracene,
1,3-dilithio-4-cyclohexene,
and the like.

The amount of catalyst used in the preparation of block copolymers can vary over a wide range but will generally be at least 0.05 part by weight of the organolithium compound per 100 parts by weight of the total monomers to be polymerized in the process. The upper limit for the amount of organolithium used depends primarily upon catalyst solubility and the desired inherent viscosity of the polymer resulting from the polymerization. A preferred effective catalyst level is from about 0.1 to about 2 parts by weight of organolithium per 100 parts by weight of total monomers charged to the polymerization zone.

The hydrocarbon diluent employed can vary widely but is preferably a hydrocarbon of one of the above-mentioned types containing from 3 to 12, inclusive, carbon atoms. Examples of such diluents include propane, n-butane, isobutane, n-pentane, n-hexane, n-decane, n-dodecane, cyclohexane, cyclopentane, methylcyclohexane, benzene, toluene, xylene, and the like. Mixtures of two or more of these hydrocarbons can be employed.

Block copolymers prepared by using an organomonolithium initiator can be treated with a polyfunctional agent to terminate the polymerization and to couple together two or more block copolymers. Other suitable methods of making block copolymers can be found in U.S. Patent 3,030,346, issued to Cooper on Apr. 17, 1962.

At the completion of the above polymerization reactions the reaction mixture is inactivated by the addition of one or more conventional catalyst-inactivating materials such as water, alcohols, organic and inorganic acids, and the like. Also, suitable additives such as antioxidants, stabilizers, pigments and the like can be added to the copolymer product.

The amount of rubbery copolymer blended with the polystyrene is dependent primarily upon the conjugated diene content of the rubber and therefore can be expressed in terms of amount of conjugated diene in the final composition. The conjugated diene content of the final composition of this invention is in the range of from about 5 to about 40, preferably from about 8 to about 25, weight percent.

The peroxy compounds which can be employed in this invention include organic and inorganic peroxides. The term "organic peroxides" is meant to include the hydroperoxides, unless otherwise stated, and to encompass compounds containing from 4 to 40 carbon atoms per molecule, inclusive. The organic peroxides can also be substituted with non-peroxy members such as halogen, hydroxy radicals, ether and/or ester linkages, and the like. The inorganic peroxides include calcium peroxide, barium peroxide, zinc peroxide, lead peroxide, and mixtures thereof.

Examples of suitable peroxides include:

methyl n-propyl peroxide,
diethyl peroxide,
ethyl isopropyl peroxide,
di-tert-butyl peroxide,
di-n-hexyl peroxide,
n-hexyl n-decyl peroxide,
dieicosyl peroxide,
dicyclohexyl peroxide,
dicyclopentyl peroxide,
bis(2,4,6-trimethylcyclohexyl) peroxide,
bis(3,5-dichlorocyclohexyl) peroxide,
bis(4-phenylcyclohexyl) peroxide,
bis(2-cyclohexenyl) peroxide,
bis(4-methyl-2-hexenyl) peroxide,
bis(4-octenyl) peroxide,
dipropionyl peroxide,
dilauroyl peroxide,
dibenzoyl peroxide,
dicrotonyl peroxide,
dibenzyl peroxide,
dicumyl peroxide,
methyl 2-n-propyl-3-butenyl peroxide, bis(alpha-ethylbenzyl) peroxide,
bis[diisopropyl-(4-isopropylphenyl)methyl]peroxide,
bis[dimethyl-(4-tert-butylphenyl)methyl]peroxide,
benzyl alpha-methylbenzyl peroxide,
bis[(4-chlorobenzoyl)]peroxide,
bis(2,4-dichlorobenzoyl) peroxide,
bis(2-propoxy-n-hexyl) peroxide,
n-pentyl 5,8-diphenyldodecyl peroxide,
bis(9,10-dihydroxydecyl) peroxide,
2,5-di(tert-butylperoxy)-2,5-dimethylhexane,
bis(2-hydroxyheptyl) peroxide,
tert-butyl hydroperoxide,
dodecyl hydroperoxide,
eicosyl hydroperoxide,
triacontanyl hydroperoxide,
4-methylcyclohexyl hydroperoxide,
phenylcyclohexane hydroperoxide,
3-cyclohexenyl hydroperoxide,
3-phenyl-2-cyclohexenyl hydroperoxide,
4-cyclopentyl-n-butyl hydroperoxide,
cumene hydroperoxide (dimethylphenylhydroperoxymethane),
diisopropylbenzene hydroperoxide[dimethyl-(4-isopropylphenyl) hydroperoxymethane],
(4-ethoxyphenyl) methyl hydroperoxide,
di-n-hexyl-4-hydroxyphenylhydroperoxymethane,
dimethyl(3-methoxyphenyl) hydroperoxymethane,
peroxybenzoic acid,
peroxybutyric acid,
peroxydodecanoic acid,
tert-butyl peroxybenzoate,
di-tert-amyl diperoxyphthalate,
tert-dodecyl peroxyacetate.

Peroxides formed by the oxidation of terpene hydrocarbons such as pinane, alpha-pinene, p-menthane, and turpentine can also be used.

The peroxides which are preferred in this invention are those which decompose at a temperature of at least 250° F. The upper maximum decomposition temperature is dictated primarily by practicality rather than functionality, i.e. it should be such that substantially complete decomposition of the peroxide occurs during preparation of the composition. The amount of peroxy compound or compounds employed according to this invention is that which will provide from about 0.25 to about 6, preferably from about 0.35 to about 4.5 gram millimoles of peroxy oxygen (—O—O—) per 100 grams of conjugated diene in the above-described copolymer or copolymers.

The polystyrene, conjugated diene block copolymer, and peroxy compound can be mixed or blended in any conventional manner, a primary desired result being an intimate mixture of the components. It is presently preferred that the mixing, when the peroxy compound is present, be carried out in the substantial absence of air in order to effect maximum property improvement. However, it does not appear at present to be mandatory that substantially all air be excluded, for example satisfactory results can be obtained by Banbury mixing if the Banbury is merely substantially full. Generally, any internal mixer such as a Banbury, twin screw extruder, Brabender Plastograph, and the like can be employed. Mixing in a vacuum or an inert atmosphere such as nitrogen can also be advantageously employed in this invention. It should be noted that various blending techniques can be employed, e.g. blending only a portion of one or more components, preferably all the rubber component and a portion of the polystyrene, in a first mixing cycle and then adding the remainder of those one or more components, such as the remainder of the polystyrene, for additional mixing in a second mixing cycle.

Although the mixing temperature when the peroxy compound is present in the mix is that sufficient to substantially decompose the peroxy compound, in general, the mixing temperature will most times fall in the range of from about 250 to about 600, preferably from about 300 to about 500 ° F. The mixing time, as with the mixing temperature, can vary widely but will generally be in the range of from about 1 to about 30, preferably from about 2 to about 10, minutes. The blend can also be heated to similar temperatures after mixing is terminated or the heating operation can overlap the mixing period and the period following the termination of the mixing operation.

The blends of this invention can also contain other ingredients normally included in such compounds. For example, antioxidants, pigments, dyes, fillers, stabilizers, plasticizers, and the like can be included in these blends.

EXAMPLE I

A heat and light stabilized, general purpose, polystyrene ("Styron" 673, a trademark of and manufactured by the Dow Chemical Company) was blended with a rubbery, block-type butadiene/styrene copolymer using 75 parts by weight of polystyrene and 25 parts by weight of copolymer. In order to demonstrate the effect of peroxide, a series of blends was prepared in which a different amount of recrystallized bis($\alpha,\alpha$-dimethylbenzyl) peroxide, i.e. dicumyl peroxide, was added to each composition. One blend was prepared without peroxide. Blending was conducted under vacuum in an internal mixer (Brabender Plastograph). The rubber and polystyrene were blended for 3 minutes, the peroxide was added, and mixing was continued for 10 minutes. In the run without peroxide, the rubber and polystyrene were blended for 10 minutes. The plastograph was operated at 100 r.p.m. After removal from the mixer, the materials were compression molded at 350° F. into sheets 1/16 inch in thickness. The sheets were cut into ½ inch strips from which dog bone specimens were machined. A two inch gage length was used for the test specimens and the width in the gage area was ¼ inch.

The following recipe was used for preparing the rubbery block copolymer:

| | |
|---|---|
| 1,3-butadiene, parts by weight | 75 |
| Styrene, parts by weight | 25 |
| Cyclohexane, parts by weight | 860 |
| n-butyllithium, mhm.[1] | 0.19 |
| Temperature, ° F. | 120–190 |
| Time, hours | 1 |

[1] Mhm.=gram millimoles per 100 grams monomer.

Styrene was polymerized first and then the butadiene was added and polymerized to form the block copolymer. Conversion was quantitative. The polymerization was terminated with 0.5 part by weight per 100 parts by weight of monomers charged of liquid epoxidized polybutadiene ("Oxiron" 2000, a trademark of and manufactured by Food Machinery and Chemical Company), transferred to a blowdown tank, stabilized with 0.1 part by weight per 100 parts by weight of monomers charged of 2,6-di-tert-butyl-4-methylphenol in isopropyl alcohol, steam stripped, and extruder dried. It was substantially gel free and had an inherent viscosity of 1.58.

The mixing temperatures and properties of the blends were as follows:

TABLE I

| Run No. | Peroxide, g. mmoles —O—O— per 100 g. Bd | Mixing Temp., ° F. | | Tensile, p.s.i.[1] | Elong., percent [1] | Notched Izod Impact, ft.-lbs./in.[2] |
|---|---|---|---|---|---|---|
| | | Initial | Final | | | |
| 1 | 0.0 | 333 | 358 | 3,490 | 7 | 5.0 |
| 2 | 0.04 | 336 | 360 | 3,320 | 2 | |
| 3 | 0.15 | 334 | 358 | 3,550 | 7 | 5.9 |
| 4 | 0.99 | 351 | 363 | 3,640 | 29 | 5.2 |
| 5 | 1.97 | 351 | 365 | 3,510 | 35 | 4.0 |
| 6 | 4.26 | 349 | 370 | 3,830 | 33 | 3.0 |

[1] ASTM D-638-61T, samples drawn at rate of 0.2 inch per minute.
[2] ASTM D-258-54T, foot pounds per inch of notch, ⅛ inch bar.

These data show that spectacular results were obtained when the amount of peroxy oxygen was in the range of 0.99 to 4.26 gram millimoles of peroxy oxygen per 100 grams of butadiene in the resin composition.

EXAMPLE II

The same type of polystyrene as that used in Example I was blended with another block butadiene/styrene copolymer using 75 parts by weight of polystyrene and 25 parts by weight of copolymer. The copolymer had a Mooney value of about 47 ML-4 at 212° F. The blends were prepared by mixing the polystyrene, copolymer, and peroxy compound in a 5-pound Banbury mixer. Air in the mixer was displaced by adding one weight percent water thereto. The compositions were mixed for four minutes, after which 2 parts per 100 by weight of the blend of tris(nonylphenyl) phosphite and 1 part per 100 parts by weight of the blend of 2,6-di-tert-butyl-4-methylphenol were added and mixing continued for one additional minute. The compositions were chopped, extruded into pellets, and injection molded into test specimens at 450° F.

The block copolymer employed in these runs was prepared in n-hexane diluent using n-butyllithium as the initiator. All ingredients were charged initially. Polymerization was initiated at about 150° F. and the temperature increased to about 220° F. during the reaction. On completion of the polymerization, one part by weight per 100 parts of rubber of a mixture of $C_{16}$ to $C_{18}$ saturated and unsaturated fatty acids was added to inactivate the catalyst and one part by weight per 100 parts rubber of 2,6-di-tert-butyl-4-methylphenol was added as antioxidant. The mixture was steam stripped and the wet rubber crumb was washed and dried.

The properties of the blends are shown in Table II:

TABLE II

| Dicumyl Peroxide, Gram millimoles —O—O— per 100 grams Butadiene | Tensile, p.s.i.[1] | Elongation, percent [1] | Notched Izod Impact, ft.-lbs./in.[2] | Dump Temp., °F. |
|---|---|---|---|---|
| None | 1,660 | 4 | 1.0 | 380 |
| 0.39 | 2,840 | 18 | 3.9 | 400 |
| 0.78 | 2,940 | 24 | 4.5 | 405 |
| 1.56 | 3,110 | 25 | 4.4 | 410 |

[1] See footnote 1, Table I. [2] See footnote 2, Table I.

These data show that equally as spectacular results were obtained when the amount of peroxy oxygen was in the range of 0.39 to 1.56 gram millimoles peroxy oxygen per 100 grams of butadiene in the resin composition.

EXAMPLE III

The same polystyrene and copolymer as described in Example II were mixed in the same manner as set forth in Example II. However, different types of peroxides were substituted for the recrystallized dicumyl peroxide. The amount of each different peroxide employed was that equivalent to 1.97 gram millimoles of peroxy oxygen per 100 grams of butadiene in the composition.

The results of this example are shown in Table III:

TABLE III

| Run No. | Peroxide | Tensile, p.s.i.[1] | Elongation, percent [1] | Notched Izod Impact, ft.-lbs./in.[2] | Dump Temperature, °F. |
|---|---|---|---|---|---|
| 1 | Tert-butyl-peracetate | 3,550 | 27 | 4.5 | 400 |
| 2 | Tert-butyl-perbenzoate | 3,250 | 33 | 4.0 | 400 |
| 3 | 2,5-dimethyl-2,5-di(tert-butylperoxy) hexane | 3,250 | 35 | 3.8 | 410 |
| 4 | Di-tert-butyl peroxide | 3,170 | 42 | 3.2 | 410 |
| 5 | p-Menthane hydroperoxide | 2,930 | 41 | 3.7 | 405 |
| 6 | Cumene hydroperoxide | 2,930 | 29 | 3.4 | 405 |
| 7 | Tert-butyl hydroperoxide | 2,860 | 22 | 3.1 | 400 |
| 8 | None | 1,660 | 4 | 1.0 | 380 |

[1] See footnote 1, Table I. [2] See footnote 2, Table I.

These data show that different peroxy compounds can be employed in the practice of this invention and the spectacular results of this invention still achieved.

Reasonable variations and modifications are possible within the scope of this disclosure without departing from the spirit and scope thereof.

I claim:

1. A polystyrene composition formed by blending (1) polystyrene, (2) at least one solution-polymerized, rubbery block copolymer of a conjugated diene and a monovinyl substituted aromatic hydrocarbon, and (3) a material supplying from about 0.35 to about 4.5 gram millimoles of peroxy oxygen per 100 grams of conjugated diene in said block copolymer, and subjecting said blend to a temperature sufficient to decompose the material containing said peroxy oxygen, the final blend comprising at least 50 weight percent polystyrene, the remainder being substantially all block copolymer.

2. A product according to claim 1 wherein said blend is formed first and then heated.

3. The product according to claim 1 wherein said materials are heated at least while the blending of same is being carried out.

4. The product according to claim 1 wherein all of the block copolymer and peroxy oxygen yielding material is blended with a portion of the polystyrene and thereafter the remainder of the polystyrene is added with blending.

5. A polystyrene composition of improved physical properties formed by blending polystyrene, at least one solution-polymerized, rubbery block copolymer of a conjugated diene and a monovinyl substituted aromatic hydrocarbon, and a peroxy compound, the amount of conjugated diene present in said block copolymer being in the range of from about 40 to about 95 parts by weight of the conjugated diene and monovinyl substituted aromatic, the amount of conjugated diene in the final blend being in the range of about 5 to about 40 weight percent, based upon the total weight of the blend, the amount of peroxy compound being that which will provide from about 0.35 to about 4.5 gram millimoles of peroxy oxygen per 100 grams of conjugated diene in the copolymer, and heating said blend while or after forming same at a temperature and for a time sufficient to substantially completely decompose said peroxy compound, the final blend comprising at least 50 weight percent polystyrene, the remainder being substantially all block copolymer.

6. A product formed by blending polystyrene; a solution-polymerized, rubbery block copolymer of a conjugated diene having from 4 to 10 carbon atoms per molecule and a monovinyl substituted aromatic hydrocarbon having from 8 to 12 carbon atoms per molecule and a material which will supply from 0.35 to 4.5 gram millimoles of peroxy oxygen per 100 grams of conjugated diene in said block copolymer and heating said blend at a temperature sufficient to substantially completely decompose the peroxy oxygen supplying material, the final blend comprising at least 50 weight percent polystyrene, the remainder being substantially all block copolymer.

7. A product according to claim 6 wherein said temperature is at least 250° F.

8. A product formed by blending polystyrene, at least one rubbery block copolymer having a rubbery block and a resinous block selected from the group consisting of butadiene/styrene, isoprene/styrene and piperylene/styrene, wherein the amount of conjugated diene present in said block copolymer is in the range of from about 40 to about 95 parts by weight per 100 parts by weight of the monomers used to prepare said block copolymer, the rubbery block contains from 50 to 100 parts by weight of conjugated diene per 100 parts by weight of the rubbery block, the resinous block contains at least 80 parts by weight of styrene per 100 parts by weight of the resinous block, and the block copolymer contains from 5 to 75 parts by weight of the resinous block per 100 parts by weight of the block copolymer, and a material yielding from about 0.35 to about 4.5 gram millimoles of peroxy oxygen per 100 grams of conjugated diene in said copolymer and heating said blend while or after forming same at a temperature in the range of from about 250 to about 600° F., the final blend comprising at least 50 weight percent polystyrene, the remainder being substantially all block copolymer.

9. A product according to claim 8 wherein the block copolymer contains at least 50 parts by weight of conjugated diene per 100 parts by weight of monomers employed to make the block copolymer, and at least 5 parts by weight of styrene in the homopolymerized form per 100 parts by weight of monomers employed to make the block copolymer as determined by oxidative degradation, the remainder being substantially all styrene.

10. A product according to claim 8 wherein said block copolymer consists essentially of butadiene/styrene.

11. A product according to claim 8 wherein said block copolymer consists essentially of isoprene/styrene.

12. A product according to claim 8 wherein said block copolymer consists essentially of piperylene/styrene.

References Cited

UNITED STATES PATENTS

| | | | |
|---|---|---|---|
| 2,623,863 | 12/1952 | Dieckmann et al. | 260—892 XR |
| 2,844,562 | 7/1958 | Ingram | 260—892 |
| 3,129,199 | 4/1964 | Lunk | 260—880 |
| 3,231,635 | 1/1966 | Holden et al. | 260—876 XR |
| 3,251,905 | 5/1966 | Zelinski | 260—879 |

GEORGE F. LESMES, *Primary Examiner.*

U.S. Cl. X.R.

260—892